April 2, 1929. P. M. RAINEY Re. 17,250

RECORD SELECTING SYSTEM

Original Filed July 2, 1924 4 Sheets-Sheet 1

INVENTOR

Paul M. Rainey

April 2, 1929. P. M. RAINEY Re. 17,250

RECORD SELECTING SYSTEM

Original Filed July 2, 1924 4 Sheets-Sheet 2

INVENTOR

Paul M. Rainey

April 2, 1929.

P. M. RAINEY

Re. 17,250

RECORD SELECTING SYSTEM

Original Filed July 2, 1924

4 Sheets-Sheet 3

INVENTOR

Paul M. Rainey

April 2, 1929. P. M. RAINEY Re. 17,250
RECORD SELECTING SYSTEM
Original Filed July 2, 1924 4 Sheets-Sheet 4
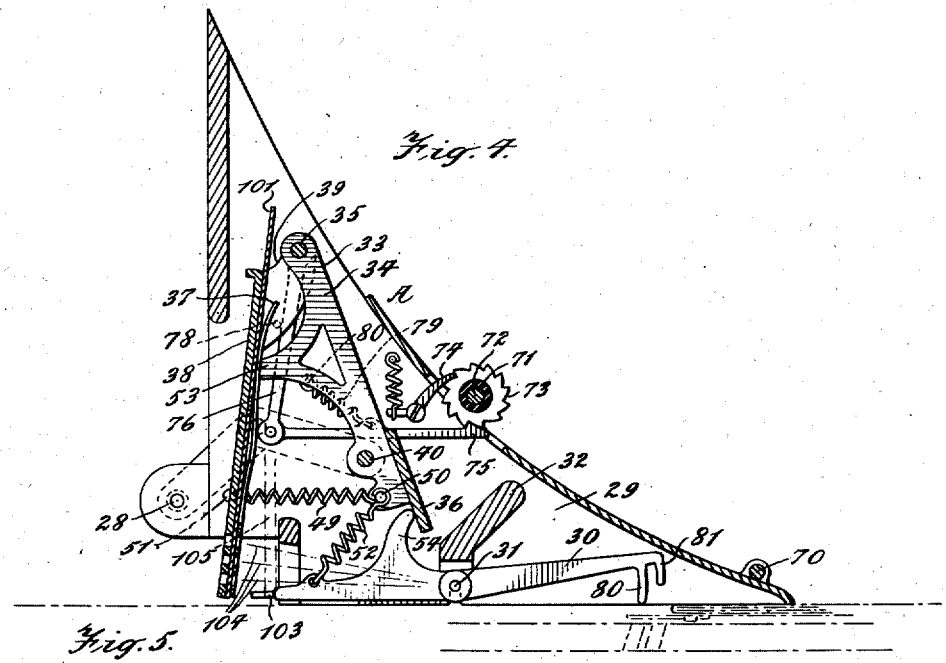
Fig. 4.
Fig. 5.
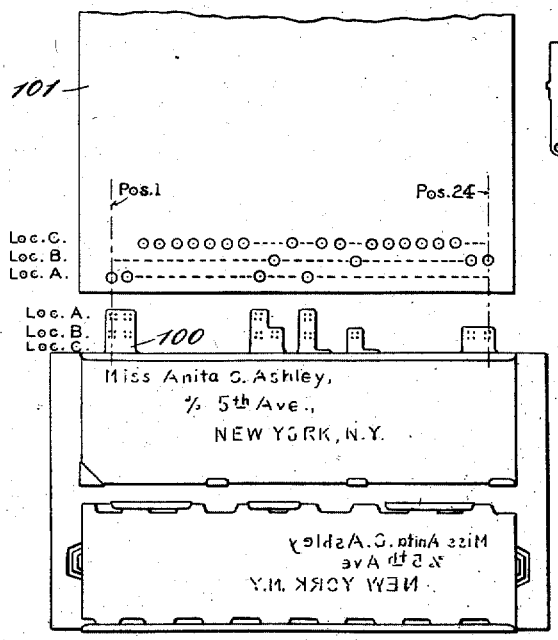
Fig. 6.
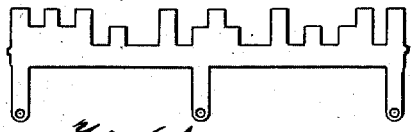
Fig. 6-A
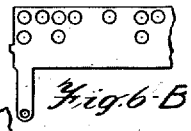
Fig. 6-B
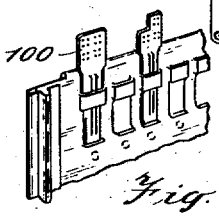
Fig. 7.
INVENTOR
Paul M. Rainey Reissued Apr. 2, 1929.

Re. 17,250

UNITED STATES PATENT OFFICE.

PAUL M. RAINEY, OF MONTCLAIR, NEW JERSEY, ASSIGNOR, BY DIRECT AND MESNE ASSIGNMENTS, TO COMBINATION SELECTOR COMPANY, OF MONTCLAIR, NEW JERSEY, A CORPORATION OF NEW JERSEY.

RECORD-SELECTING SYSTEM.

Original No. 1,599,623, dated September 14, 1926, Serial No. 723,674, filed July 2, 1924. Application for reissue filed August 28, 1928. Serial No. 302,622.

This invention relates to the method of and means for automatically selecting from a group one or more record members or tokens having predetermined indicia and producing a record or an identification of the selected members.

The particular embodiment of the invention herein disclosed is applied to an addressograph machine and consists of a unitary structure which may be used with and form a part of such machine whereby one or more record members or tokens possessing the same or similar indica may be automatically selected from a group or plurality of such members and moved sequentially to the recording position, and after the desired information or identification has been recorded, the members are delivered sequentially to a receiving means and stack in their original relative positions.

An object of the invention is to provide means whereby when the record members are withdrawn from the group automatically and moved sequentially to the printing position only those members having certain predetermined indica will be selected and acted upon by the recording mechanism.

Another object is to provide a selecting mechanism of this character which may be constructed as a unit and readily attached to various forms of recording or addressing machines.

Another object of this invention is to provide a system which will make it possible to record a great number of characteristics on a given record member or token of moderate size and make any member having any combination of characteristics automatically selectable or any member having certain characteristics selectable regardless of certain other characteristics.

Another object is to provide a system which will select or identify certain record members possessing certain characteristics or certain combinations of certain characteristics without changing the sequential order of these members, thus making the members readily locatable for the purpose of recording changes in characteristics.

To attain these objects and in accordance with one feature of the invention there is provided on each record member or token a printing card or address plate, and one or more tabs having lacuna or projections of different outline or differently spaced on the plates to indicate or serve as a symbol of the characteristics of the person or thing represented by the members or tokens.

Another feature is the provision in a unitary structure to be attached to an addressing or recording machine, of a series of levers or feelers adapted to be differently set when coming into contact with said tabs or lacuna on each plate to particularly identify each plate as it is passed to the printing position.

Another feature is the provision of a matrix, index or master identification card that may be provided with lacuna, impressions or other marks of identification applicable to a particular class or classes of characteristics that it is desired to select for printing.

Another feature is the provision of means in the unitary structure for insertion of one of said master identification cards, whereby when the feelers have registered the presence of a printing plate, in the printing position, having identification tabs corresponding to the lacuna or impressions on the master identification card, said means may be actuated to permit the printing mechanism to act upon said plate to print or record the indicia or symbols on the passing sheet.

Another feature is the provision of means for moving or advancing the sheet or record listing means one step for each impression made thereon regardless of how many address plates pass by the printing position without being identified, that is the sheet is advanced only when an impression is made thereon. Obviously the listing or recording means may be arranged to record only the non-selected record members if desired.

While it is evident that this invention may be advantageously used in a number of fields, perhaps one of the most likely uses is in the personnel service for the selection of employees or classes of persons having certain qualifications required for certain positions. For example, an employment agency or a personnel department of a large concern may keep a record of employees on the record members or printing plates, the member for each person being provided with identification tabs or lacuna arranged to represent the person's qualifications or characteristic tendencies.

Referring to the drawings Fig. 1 is a perspective view of the invention applied to a well known make of addressing machine.

Fig. 4 is a skeleton side view of the moving parts of the invention.

Fig. 5 shows a matrix card perforated or having lacuna to select the members possessing the desired indicia.

Fig. 6 shows a printing plate provided with tabs or members arranged in a predetermined manner to correspond with the characteristics of the person represented by the indicia on the plate.

Figs. $6^A$, $6^B$ and 7 illustrate various ways projections, perforations and tabs may be arranged on the edge of the printing plate.

Figure 1:
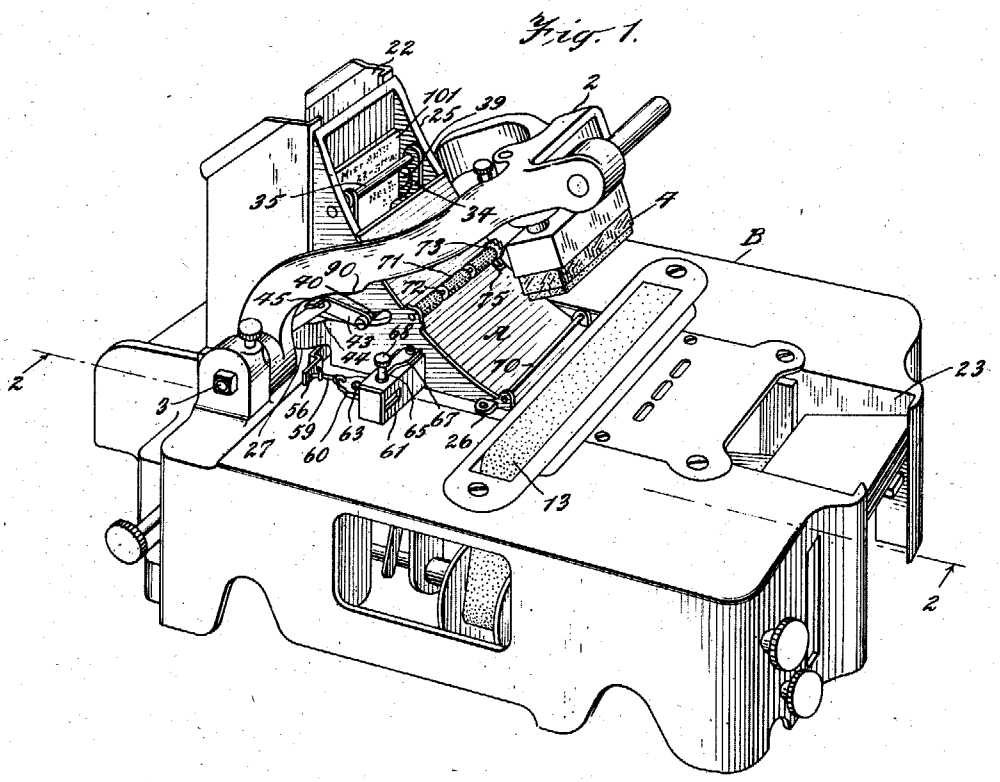
Figure 2:
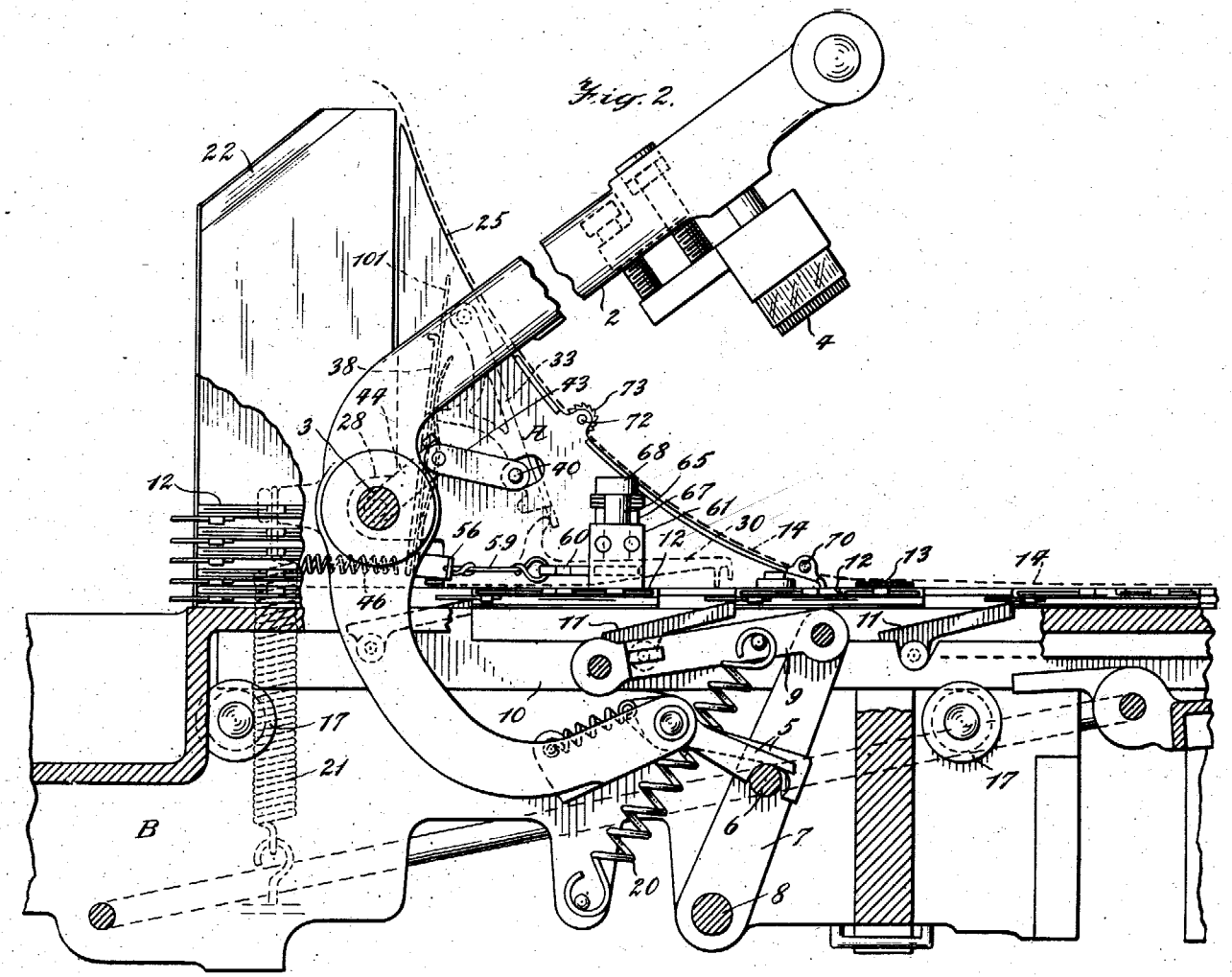
Fig. 2 is a sectional view taken on line 2—2 of Fig. 1.
Figure 3:
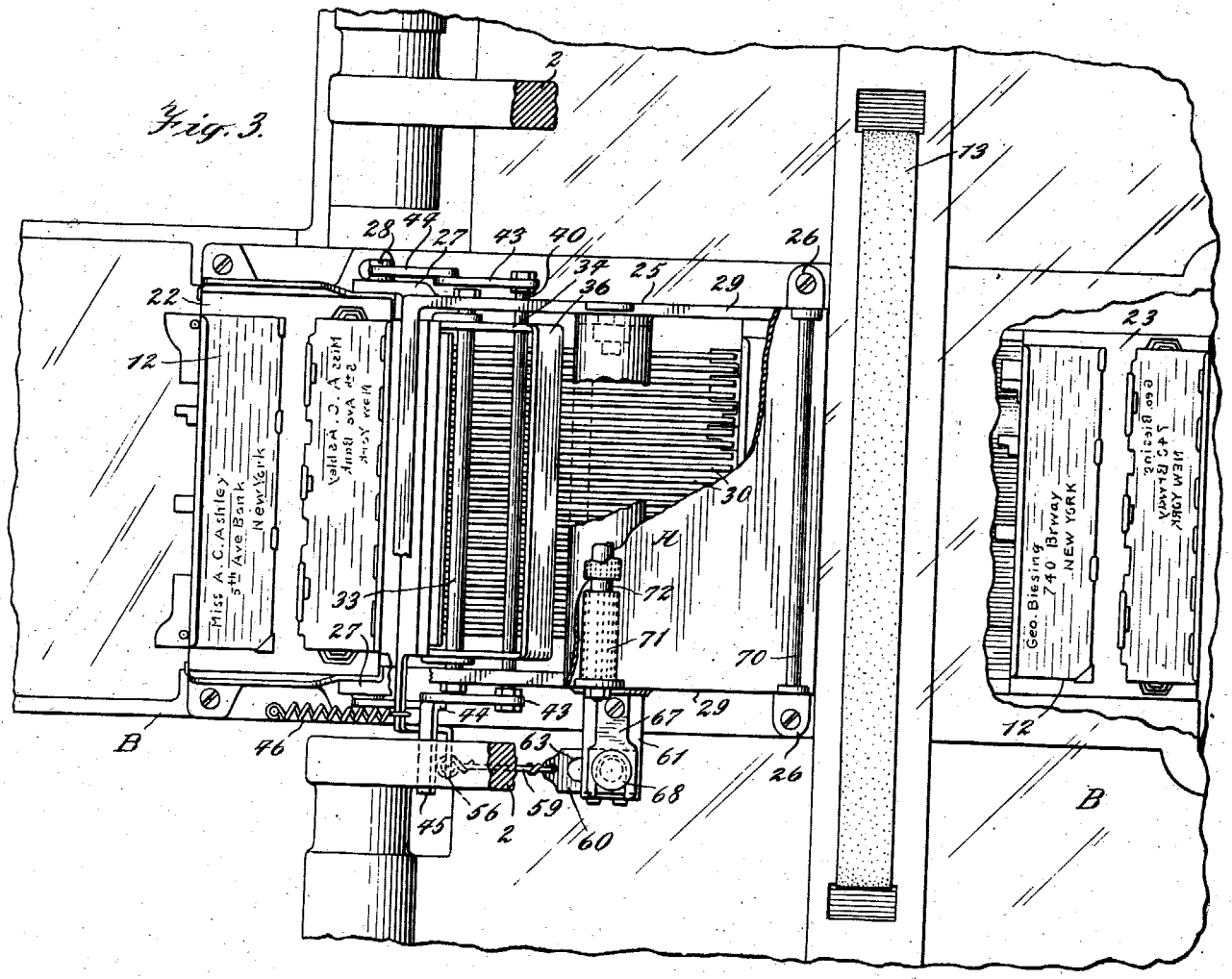
Fig. 3 is a plan view of the machine shown in Fig. 1 with portions broken away to illustrate the invention more clearly.

Referring, particularly, to Figs. 1, 2 and 3 of the drawings, A represents one form of the selecting mechanism applied to an addressing machine B. The group of record members or tokens from which those having certain indicia are to be selected are placed in a magazine 22. These members are fed sequentially through the machine and in so doing, those members having tabs or lacuna placed in a predetermined manner are selected, certain information is printed therefrom and the members are automatically stacked in a magazine 23.

A printing handle or lever 2 is pivoted at 3 and provided near one end with a printing pad 4. At the opposite end of lever 2 is a pawl 5 which cooperates with a pin 6 attached to lever 7 pivoted at 8. To the lever 7 is attached a link 9 connecting it with a feeding frame 10 provided with engaging pawls 11 adapted to advance the printing plates 12 into the printing position under printing ribbon 13 so that when the lever 2 is moved downwardly, the printing pad will bring the sheet 14 (indicated by dotted lines, Fig. 2) in contact with the ribbon and against the embossed characters on the printing plate 12 and thereby secure on its underside an impression of the name and address or other indicia on the printing plate 12. The printing plates are fed from the magazine 22 sequentially to the printing position by pawls 11 engaging the printing plates on each side of the frame 10 each time the printing handle is pressed down a sufficient distance, and consequently, the frame 10 is moved forward sufficiently to permit a succeeding plate to be removed from the bottom of the magazine 22. The frame 10 is mounted on rollers 17 and the plates after they have passed the printing position are deposited in the compartment 23 in the same order as they occupied in magazine 22. The handle 2 is returned to normal by means of springs such as 20 and 21, shown attached to the link 9 and the frame of the machine.

Referring now particularly to the attachment embodying the invention, the housing 25 is placed in front of the magazines 22 between the two arms of the lever 2, as shown in Fig. 1, and attached to the base by means of lugs and screws 26 and to the sides of the magazine 22 by means of lugs 27 and screws 28. Between the side members 29, of the housing 25, are secured the major portion of the movable parts, such as levers 30 which are pivoted at 31 in slots in the transverse member 32 of the housing; the frame member 33 comprising the side pieces 34 rotatably mounted on rod 35 and the cross piece 36 connecting these pieces 34 together and the frame member or master card holder 38 having lugs 39 also rotatably mounted on rod 35. The card holder 38 is provided with flat springs 37 at the sides thereof for receiving a master card 101 inserted between the same and the holder as shown in Fig. 4. A pin 40 is secured between the members 34 and extends outwardly from these members through slots in the side member 29, and attached to each end thereof is a lever or link 43, the other end of which is attached to a second link 44 which, in turn, is pivoted to the screw 28. The link 44, located on the left side of the machine looking from the front thereof, is provided with an extension 45 at right angle thereto, projecting under the left portion of lever 2 so as to be engaged thereby in a manner hereinafter to be described. The master card holder 38 is held in normal position as shown in Figs. 2, 3 and 4 by means of a spring 46. The member 33 is normally held against the holder 38 by means of a spring 49 attached at one end to a pin 50 on the member 33, and the other end to a pin 51 on the inner side of the side members 29 of housing 25 so that the lugs 53 of member 33 rest on the edges or right and left sides of the holder 38 and the levers 30 are each held normally against the cross piece 36 of member 33 by means of a spring 52 so that the extensions or lugs 54 of the levers 30 rest against the inner surface of 36 and these three parts 38, 33 and the levers 30 are therefore normally caused to be held in contact with each other as is shown most clearly in Fig. 4.

The holder 38 is provided with a projection 56 extending through an opening on the left side member 29 of housing 25 and is attached to a slide 60 by means of a link 59. Slide 60 is slidably mounted in a slot in a projection 61 extending outwardly from the left side member 29 of housing 25 provided with a slot 63 that normally does not register with a plunger 65 that is mounted in a hole projection 61 drilled at right angle to the slide 60. This plunger 65 is held out of engagement with the slide 60 by means of a flat spring 67 which engages the under side of the head 68, thereof, and is held in position to be engaged by the left arm of lever 2 when the lever is depressed.

The sheet 14 may be fed to the printing position under roller 70 by a step-by-step mechanism comprising a series of rollers 71 secured on a shaft 72, rotatably mounted between lugs extending from the side members 29 of housing 25. On this shaft near the right end thereof is mounted a ratchet wheel 73 engaged by a spring pressed holding pawl 74 and by a link pawl 75. One end of the pawl 75 is joined to a link 76 which is rotatably mounted on the shaft 35. The link 76 is normally held against a stop 78 on the right-hand side member 29 of housing 25 and the pawl 75 is normally held against the teeth of ratchet wheel 73 by means of a spring 79, secured to one end of the pawl 75, antl at its other end to a pin 80, on side member 29.

The tabs 100 may be secured to the edge of the printing plates 12 in any suitable manner, as for example, by inserting the shanks thereof in slots in the edge of the printing plates, as shown in Fig. 7, or the equivalent of tabs 100 may be used as shown in Figs. $6^A$ and $6^B$.

A complete understanding of the system can perhaps best be given by describing an application to a specific problem. A personnel problem has been chosen because it is typical of the kind of problems to which the invention is well suited.

In applying the system to the personnel of any organization each person in that organization will be represented in a file by one record member Fig. 6. The characteristics of each person will be denoted on this member by the particular tab combination on the upper edge or by the contour of the upper edge Fig. $6^A$ or by the holes punched as in Fig. $6^B$. The selection of tabs Fig. 6, the determination of the contour Fig. $6^A$ or the positions of the holes Fig. $6^B$ to denote the characteristics of a given person will be determined by a prearranged chart of which the following is illustrative.

*Personnel classification.*

| Pos. | Group characteristics | Detail characteristics | | |
|---|---|---|---|---|
| | | A | B | C |
| 1 | Sex | Female | Male | |
| 2 | Citizenship | Foreign | Naturalized | Born. |
| 3 | Age | 20– | 20–30 | 30–40. |
| 4 | | 40–50 | 50–60 | 60+. |
| 5 | Salary per week | –20 | 20–30 | 30–40. |
| 6 | | 40–60 | 60–80 | 80+. |
| 7 | State | Single | Married | Other. |
| 8 | Education | Grammar | High school | College. |
| 12 | Appearance | Immaculate | Neat | Slovenly. |
| 19 | Disposition | Happy | Normal | Gloomy. |
| 24 | Physical | Robust | Normal | Delicate. |

On each record member as shown by Figs. 6, $6^A$ or $6^B$ there may be 24 selecting positions 1–24 and for each there may be locations, A, B and C.

In general each selecting position represents a group of characteristics and each location in that position represents a detail characteristic in that group. The detail characteristics assigned to one group should be incompatible with others in the same group. If the number of detail characteristics falling in a group is greater than the number of locations in one selecting position, two or more selecting positions may be assigned to one group. This is illustrated by 3 and 4, and 5 and 6, of the above chart. Assuming that all the personnel of the organization now have record members or tokens recording their characteristics, the operation of the system is as follows:

Matrix or master cards are provided as shown in Fig. 5. These cards have blank spaces representing the selecting positions 1–24 and locations A, B and C as indicated and a printed description of the characteristics assigned to each. Suppose it is desired to know how many, or make a list of employees who are females of foreign birth not naturalized who are less than 20 years of age and receiving less than $20.00 per week salary. Then a matrix card would be punched as follows:

Pos. 1 Loc. A.
Pos. 2 Loc. A.
Pos. 3 Loc. A.
Pos. 5 Loc. A.

Since we are not interested in characteristics other than those mentioned, all locations in the other positions would also be punched. In other words, the characteristics of these other positions are rendered non-determining. The matrix thus punched would be placed in position and the mechanism set to print when a selection is made.

When the lever 2 is depressed, the printing plates 12 are fed forward one step at a time from the magazine 22, and when a printing plate reaches the printing position, the feelers or fingers 80 and 81 carried by the levers 30 drop into the lacuna on the edge of plates. Depending upon the arrangement of the lacuna on the plates, the extensions 103 on the various levers 30 will move to one of the dash-dotted line positions 104. If the positions assumed by levers 30 are such that the extensions 103 are in alignment with the holes punched in the master card 101, the master card holder will move to the dash-dotted line 105, a selection will have been effected and a record or identification of the selected member will be recorded on the sheet 14. If the lacuna on the printing plates do not permit the levers 30 to assume positions corresponding with the perforations in the master card, the master card holder is prevented from moving to the dash-dotted line position 105 and no selection is effected.

If a list is desired of all those not having the above characteristics, the list may be made with the same matrix by adjusting slide 60 so that printing will occur except when a selection is made.

Suppose there is a vacancy to be filled. The first step is to prepare the specification of the kind of person best qualified. The following table shows such a specification and the locations of the punches on a matrix card to search for such person:

| | Pos. | Loc. |
|---|---|---|
| Male | 1 | B. |
| Native or naturalized citizen | 2 | B and C. |
| Between 20 and 40 years of age | 3 | B and C. |
| Salary over $40 per week | 6 | A, B, and C. |
| Single | 7 | A. |
| Education, high school or better | 8 | B and C. |
| Appearance good | 12 | A and B. |
| Disposition good | 19 | A and B. |
| Physical condition best | 24 | A. |

The number of combinations of characteristics possible in a system of this kind is the product of the number of locations in the various positions. If the number of locations is the same in all positions, it is the number of locations raised to a power equal to the number of selecting positions. In the particular system described, the number of locations is 3 and the number of selecting positions 24, hence the maximum number of selectable combinations possible is 3 raised to the 24th power or 282,429,536,481.

What is claimed is:

1. A selecting system comprising record members possessing indicia corresponding to characteristics of the persons or objects represented thereby, a selecting mechanism comprising one or more selecting members positioned by said record members, and a matrix or index member cooperating with said selecting mechanism to select or identify one or more record members possessing certain indicia from a plurality of said record members.

2. A selecting system comprising record members possessing indicia corresponding to characteristics of the persons or objects represented thereby, a selecting mechanism comprising one or more selecting members positioned by said record members, a matrix or index member cooperating with said selecting mechanism to select or identify one or more record members possessing certain indicia from a plurality of said record members, and means for recording information appearing on said record members.

3. In a record selecting system, a plurality of record members, a selecting device having feelers, a plurality of indicia on a record member to cooperate with said feelers whereby selection may be determined, distinguished from each other by their position on the record member and arranged in groups such that the presence of a certain indicium in a group is conditioned by the absence of another indicium in the same group.

4. In a record selecting system, a plurality of record members, a selecting device having feelers, indicia spatially arranged in groups on said record members to determine the position of the feelers of the selecting device, there being one feeler for each group, and means to bring a feeler into cooperation with the indicia of its group in a predetermined order whereby the first indicium present in the group taken in that order is controlling for the selecting position of the feeler.

5. In a record selecting system, a plurality of record members, a selecting device having feelers, means to position said record members successively and to test them successively with said feelers, indicia arranged in a spatial group on said record members to cooperate with a particular one of said feelers whereby said feeler assumes different successive positions, depending upon the order of the indicia in said group.

6. In a record selecting system, record members, a selector, a plurality of independent feelers in said selector positioned by said record members, and a selection controller to test said feelers collectively after they are positioned.

7. In a record selecting system having means for feeding tokens therethrough, means to select predetermined ones of said tokens, a matrix member, and recording means controlled by the movement of the matrix member for transferring data from the tokens to a record.

8. The method of selecting record members possessing indicia corresponding to characteristics represented by a matrix which consists in moving all of said record members in proximity to a selecting mechanism whereby only those record members having indicium or indicia similar to said matrix will be selected.

9. The method of selecting tokens from a plurality of associated tokens which consists in providing a matrix with identifications corresponding to the identifications on the tokens to be selected, feeding all of said tokens to a recording position whereby only those tokens having identifications corresponding to the matrix will cause the actuation of the recording means.

10. The combination of a plurality of tokens having differentiating identification means, means for feeding said tokens sequentially to a recording position, recording means, and selecting members each having a plurality of feelers controlled by the identification means for controlling the actuation of said recording means.

11. In a record selecting system, record members having indicia in a plurality of locations in each of a plurality of selecting positions, and selecting means whereby any record member possessing any combination of all or any part of the indicia is selectable.

12. In a record selecting system, record members having indicia in a plurality of locations in each of a plurality of selecting positions, a matrix member, and selecting means cooperating with said matrix member whereby any record member possessing any combination of all or any part of the indicia is selectable.

In witness whereof, I hereunto subscribe my name this 27th day of August, 1928.

PAUL M. RAINEY.